United States Patent
Guo et al.

(10) Patent No.: US 7,662,321 B2
(45) Date of Patent: Feb. 16, 2010

(54) NANO-SCALED GRAPHENE PLATE-REINFORCED COMPOSITE MATERIALS AND METHOD OF PRODUCING SAME

(75) Inventors: Jiusheng Guo, Centerville, OH (US);
Lulu Song, Centerville, OH (US);
Aruna Zhamu, Centerville, OH (US);
Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 560 days.

(21) Appl. No.: 11/257,508

(22) Filed: Oct. 26, 2005

(65) Prior Publication Data
US 2007/0092716 A1    Apr. 26, 2007

(51) Int. Cl.
*B29C 47/00* (2006.01)
*C04B 14/00* (2006.01)
*D01F 9/12* (2006.01)
*C01B 31/04* (2006.01)

(52) U.S. Cl. ............... 264/108; 252/378 R; 423/447.2; 423/448; 977/778

(58) Field of Classification Search ............ 423/447.1, 423/447.2, 448, 445 R, 460, 734, 788, 778, 423/779, 783, 784, 786, 787, 789; 977/734, 977/788; 264/5, 6, 13, 103, 108, 109; 428/323; 156/296; 524/496; 501/99; 75/243; 252/378 R
See application file for complete search history.

(56) References Cited

U.S. PATENT DOCUMENTS

| 6,934,600 | B2 | 8/2005 | Jang et al. |
| 7,071,258 | B1 * | 7/2006 | Jang et al. ............ 524/496 |
| 2003/0236588 | A1 * | 12/2003 | Jang et al. ............ 700/119 |
| 2004/0131533 | A1 * | 7/2004 | Spacie et al. ............ 423/448 |
| 2005/0282952 | A1 * | 12/2005 | Takekoshi et al. ........ 524/495 |
| 2006/0035085 | A1 * | 2/2006 | Ozaki et al. ............ 428/408 |
| 2007/0092432 | A1 * | 4/2007 | Prud'Homme et al. ...... 423/448 |

OTHER PUBLICATIONS

U.S. Appl. No. 10/858,814, filed Jun. 3, 2004, B. Z. Jang, et al.

\* cited by examiner

*Primary Examiner*—Wayne Langel
*Assistant Examiner*—Brittany M Martinez

(57) ABSTRACT

Disclosed are a nano-composite composition and a method of making such a composite that is composed of a matrix material and dispersed reinforcement nano-scaled graphene plates (NGPs) that are substantially aligned along at least one specified direction or axis. The method comprises: (a) providing a mixture of nano-scaled graphene plates (NGPs) and a matrix material in a fluent state; (b) extruding the mixture to form a filament wherein NGPs are aligned along a filament axis; (c) aligning a plurality of segments of the filament in a first direction, or moving the filament back and forth along a first direction and its opposite direction, to form a NGP-matrix filament preform; and (d) consolidating the preform to form the nanocomposite material. Also disclosed is a method of making a nano-composite fiber.

9 Claims, 5 Drawing Sheets

(A) fabrication of nano-phased fibers containing oriented NGPs (B) fabrication of a preform from nano-composite fibers (C) fabrication of an oriented composite by consolidating a preform (a)

(b)

(A) fabrication of nano-phased fibers containing oriented NGPs

(B) fabrication of a preform from nano-composite fibers

(C) fabrication of an oriented composite by consolidating a preform

NANO-SCALED GRAPHENE PLATE-REINFORCED COMPOSITE MATERIALS AND METHOD OF PRODUCING SAME

This invention is based on the results of a research project sponsored by the US DoE SBIR Program. The US government has certain rights on this invention.

FIELD OF THE INVENTION

The present invention relates generally to the field of nano-composite materials, and more particularly to nano-graphene plate-reinforced composite materials (NGP composites) and methods for the production of NGP composites. In particular examples of the invention, the nanometer-sized graphene plates of the material exhibit a controlled degree of preferred orientation.

BACKGROUND OF THE INVENTION

Carbon nanotubes (CNT) are nanometer-scale sized tube-shaped molecules having the structure of a graphite molecule rolled into a rube. A nanotube can be single-walled or multi-walled, dependent upon conditions of preparation. Carbon nanotubes typically are electrically conductive and mechanically strong and stiff along their length. Nanotubes typically also have a relatively high aspect ratio (length/diameter ratio). Due to these properties, the use of CNTs as reinforcements in composite materials for both structural and functional applications would be advantageous.

However, there are several drawbacks associated with carbon nanotube-reinforced composites. First, CNTs are known to be extremely expensive due to the low yield and low production and purification rates commonly associated with all of the current CNT preparation processes. The high material costs have significantly hindered the widespread application of CNTs. Second, it is well-known in the field of composites that the reinforcement fiber orientation plays an important role in governing the mechanical and other physical properties of a composite material. However, CNTs tend to form a tangled mess resembling a hairball, which is difficult to work with. This and other difficulties have limited efforts toward realizing a composite material containing well-dispersed CNTs with preferred orientations.

Instead of trying to develop much lower-cost processes for making CNTs, researchers (Jang, et al.) at Nanotek Instruments, Inc. have worked diligently to develop alternative nano-scaled carbon materials that exhibit comparable properties, but are more readily available and at much lower costs. This development work has led to the discovery of processes for producing individual nano-scaled graphite planes (individual graphene sheets) and stacks of multiple nano-scaled graphene sheets, which are collectively called nano-sized graphene plates (NGPs). NGPs could provide unique opportunities for solid state scientists to study the structures and properties of nano carbon materials. The structures of these materials may be best visualized by making a longitudinal scission on the single-wall or multi-wall of a nano-tube along its tube axis direction and then flattening up the resulting sheet or plate (FIG. 1(a)). FIG. 1(b) shows an atomic force microscopic picture of a sample of NGPs. In practice, NGPs are obtained from a precursor material, such as minute graphite particles, using a low-cost process, but not via flattening of CNTs. These nano materials could potentially become cost-effective substitutes for CNTs or other types of nano-rods for various scientific and engineering applications.

Specifically, Jang, et al. disclosed a process to readily produce NGPs in large quantities [B. Z. Jang, L. X. Yang, S. C. Wong, and Y. J. Bai, "Process for Producing Nano-scaled Graphene Plates," U.S. patent pending, Ser. No. 10/858,814 (Jun. 3, 2004)]. The process includes the following procedures: (1) providing a graphite powder containing fine graphite particles (particulates, short fiber segments, carbon whisker, graphitic nano-fibers, or combinations thereof) preferably with at least one dimension smaller than 200 μm (most preferably smaller than 1 μm); (2) exfoliating the graphite crystallites in these particles in such a manner that at least two graphene planes are either partially or fully separated from each other, and (3) mechanical attrition (e.g., ball milling) of the exfoliated particles to become nano-scaled, resulting in the formation of NGPs. The starting powder type and size, exfoliation conditions (e.g., intercalation chemical type and concentration, temperature cycles, and the mechanical attrition conditions (e.g., ball milling time and intensity) can be varied to generate, by design, various NGP materials with a wide range of graphene plate thickness, width and length values. Ball milling is known to be an effective process for mass-producing ultra-fine powder particles. The processing ease and the wide property ranges that can be achieved with NGP materials make them promising candidates for many important engineering applications. The electronic, thermal and mechanical properties of NGP materials are expected to be comparable to those of carbon nano-tubes; but NGP will be available at much lower costs and in larger quantities.

The NGP material can be used as a nano-scaled reinforcement for a matrix material to obtain a nanocomposite. Advantages of nano-scaled reinforcements in polymer matrices include: (1) when nano-scaled fillers are finely dispersed in the matrix, the tremendously high surface area could contribute to polymer chain confinement effects, possibly leading to a higher glass transition temperature, stiffness and strength; (2) nano-scaled fillers provide an extraordinarily zigzagging, tortuous diffusion path that results in enhanced barrier or resistance against permeation of moisture, oxygen, other gases, and liquid chemical agents; (3) nano-scaled fillers can also enhance the electrical and thermal conductivities in a polymer matrix; and (4) carbon-based nano-scaled fillers have excellent thermal protection properties and, if incorporated in a matrix material, could potentially eliminate the need for a thermal protective layer, for instance, in rocket motor applications. Enhancement in strength and stiffness for composites, to a great extent, depends upon the orientation of the reinforcement used.

In U.S. Pat. No. 6,934,600, issued on Aug. 25, 2005, Jang, et al disclosed a process of producing nanocomposite materials with oriented carbon nano-tubes (CNTs). Fundamentally, CNTs are viewed as one-dimensional nano-scaled reinforcements (needle-type). By contrast, NGPs are essentially two-dimensional nano-scaled reinforcements (platelet-type), which are expected to require substantially different processing methods or conditions to produce nanocomposites with a preferred NGP orientation.

It is to the provision of methods for producing composite materials containing well-dispersed NGPs with preferred orientations, and to composite materials containing well-dispersed NGP reinforcement with preferred orientations, that certain aspects of the invention are primarily directed.

SUMMARY OF THE INVENTION

Briefly described, example embodiments of the present invention provide improved methods of making a composite composition that includes a matrix material and dispersed NGPs as a reinforcement phase. The NGPs preferably are substantially aligned along at least one specified axis or direction. The method preferably includes: (a) providing a mixture of NGPs and a matrix material in a fluent state, (b) extruding the mixture through a small orifice under a high shear force to form a long or continuous-length filament, (c) aligning a selected number of the filament segments along at least one preferred direction to form a NGP-matrix preform, wherein the filament segments are substantially parallel to each other and to the at least one preferred direction, and (d) consolidating the preform to produce the composite composition.

In this method, the matrix material of the mixture can be maintained in either a molten state or solution state (containing a liquid solvent) so that the mixture is sufficiently fluent to be extruded out through a small orifice having a diameter preferably in the range of 0.1 μm to 50 μm. Such a high-shear extrusion results in the formation of a continuous filament with NGPs preferentially aligned along the filament axis. A textile operation such as weaving, braiding, knitting, winding, and combinations thereof is then executed to align the resulting filament or segments of the resulting filament along at least a preferred direction (say, the X-direction of an X-Y-Z Cartesian coordinate system) or two preferred directions (say, X- and Y-directions) to form a filament preform. The preform is then heated to melt out the matrix material with the resulting preform pressurized or compressed into a desired shape, which is then followed by cooling to solidify the matrix material. This step is similar to the consolidation step of a traditional textile structural composite.

Another embodiment of this invention is a composite composition, which is composed of a matrix material and preferably 0.5% to 50% by volume of NGPs with the NGPs having their plate plane (with a length and a width direction) being substantially parallel to each other along at least one specified direction or axis. Preferably, at least 50% out of the NGPs have their plate plane being inclined at an angle of 15 degrees or less with respect to the at least one specified direction or axis. This composite composition may be in a fiber form or a bulk composite structure.

In yet another preferred embodiment, the structure of the composite is composed of at least two layers with the first layer containing NGPs aligned predominantly along a first specified direction or axis (e.g., X-direction) and second layer containing NGPs aligned predominantly along a second specified direction or axis (e.g., Y-direction). In a three-directional composite, the NGPs have their elongate (length) axis being oriented along at least three specified directions or axes. The matrix material may be, for example, selected from the group consisting of organic, polymeric, metallic, ceramic, glass, carbonaceous materials and/or combinations thereof.

DESCRIPTION OF THE PREFERRED EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 3:
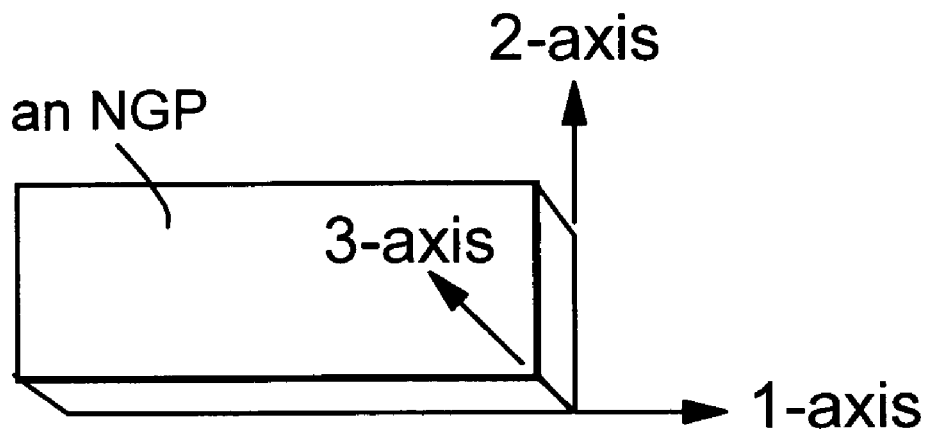
FIG. 3 (a) Schematic of an NGP with 1-, 2-, and 3-axes; (b) The NGP may be oriented along a preferred direction with the 1-2 plane being inclined at an angle θ relative to a reference axis (e.g., a fiber axis).
Figure 3:
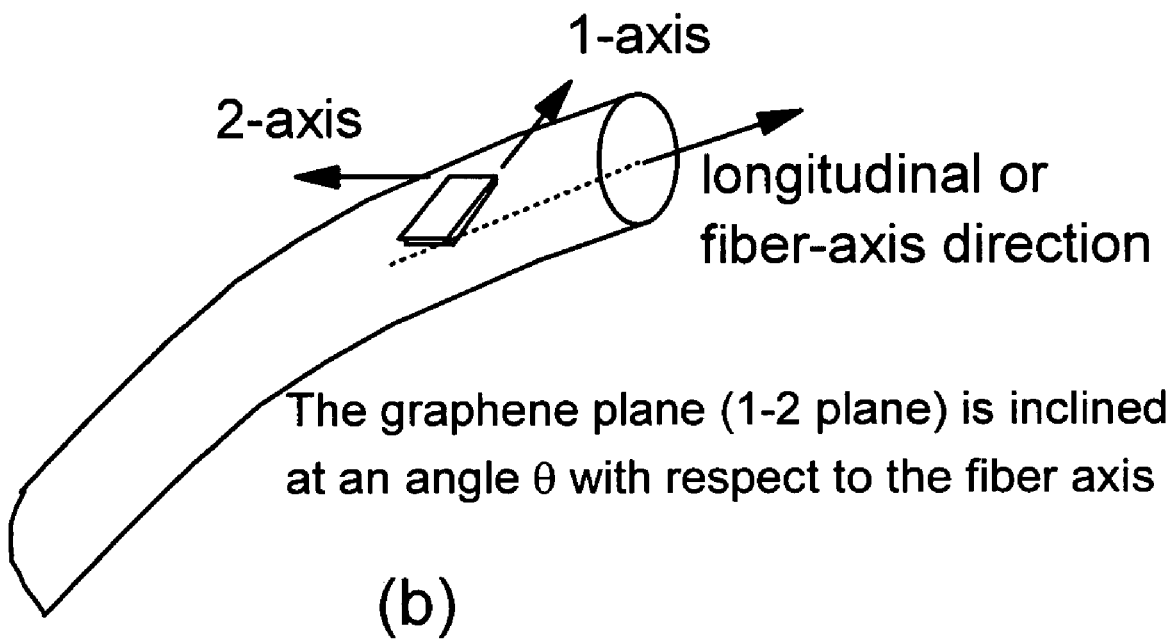

For the purpose of defining the geometry and orientation of a NGP, the NGP is described as having a length (the largest dimension), a width (the second largest dimension), and a thickness (the smallest dimension, typically smaller than 100 nm). Both the length and width are typically smaller than 10 μm, more preferably smaller than 1 μm, and most preferably smaller than 200 nm. The length (1-axis), width (2-axis), and thickness (3-axis) together define an 1-2-3 material coordinate system (FIG. 3(a)). The graphene plane or platelet plane is defined by the 1-2 axes. The 1-2 plane or graphene plane may be inclined with a reference axis (e.g., the longitudinal axis of a fiber, FIG. 3(b)) at an angle θ. This reference axis may be a direction in a three-dimensional space defined by a Cartesian coordinate system, X-Y-Z.

In one embodiment, the present invention provides a method of making a composite composition that includes a matrix material and NGPs that are dispersed in the matrix as a reinforcement phase. The NGPs are substantially aligned along at least one specified axis or direction. The method preferably includes: (a) providing a mixture of NGPs and a matrix material in a fluent state, (b) extruding the mixture through a small orifice under a high shear force to form a long or continuous-length filament, (c) aligning a selected number of the filament segments along at least one preferred direction to form a NGP-matrix preform, wherein the filament segments are substantially parallel to each other and to the at least one preferred direction, and (d) consolidating the preform to produce the composite composition.

The matrix material is preferably a polymeric material, which is a thermosetting resin, a thermoplastic, or a combination (such as a semi-interpenetrating network polymer). It is easier to use a thermoplastic matrix (e.g., nylon) to produce NGP-reinforced polymer fibers. A polymer engineer would most likely expect that it is extremely difficult, if not impossible, to produce fibers or filaments from a thermosetting resin. Much to our surprise, most of the thermosetting resins with controllable curing reactions could be mixed with NGPs and extruded to produce filaments or thin elongated rods, which could be rapidly "frozen" to produce handleable solid-state filaments or rods. These filaments or rods, containing NGPs well-aligned along the filament or elongate axis, could then be aligned along a preferred direction to produce a preform. The preform was then consolidated by completing the cure process.

Figure 1A:
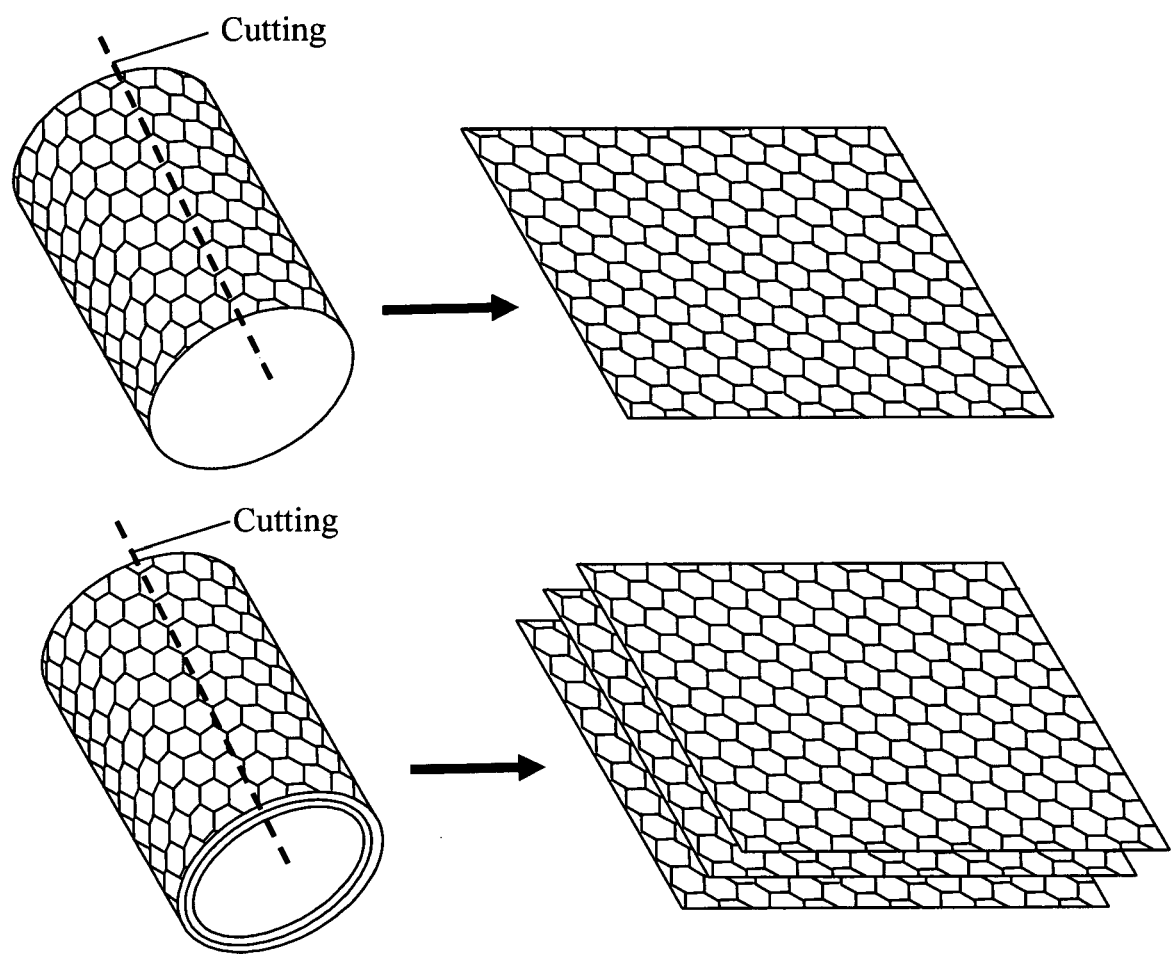
FIG. 1 (a) Schematic of NGPs in comparison with CNTs; (b) Atomic force microscopic image of selected NGPs.
Figure 1B:
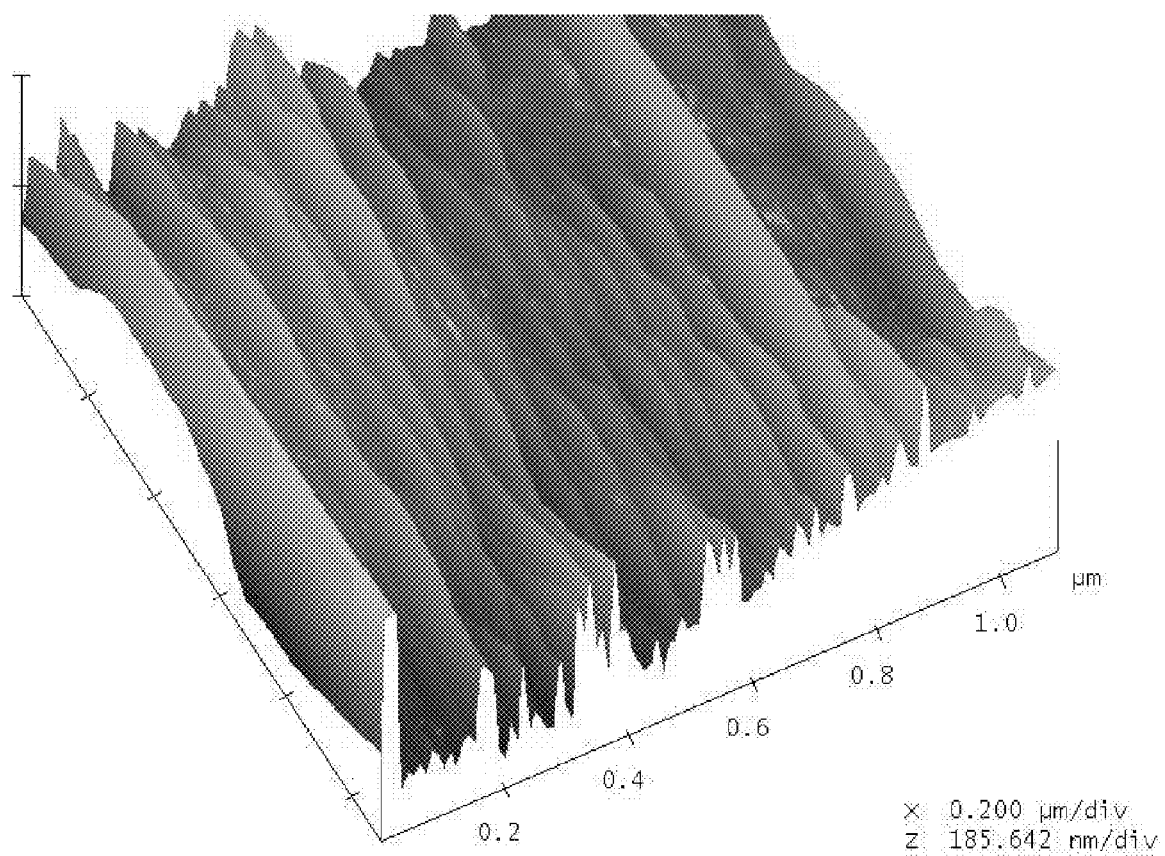
Figure 2:
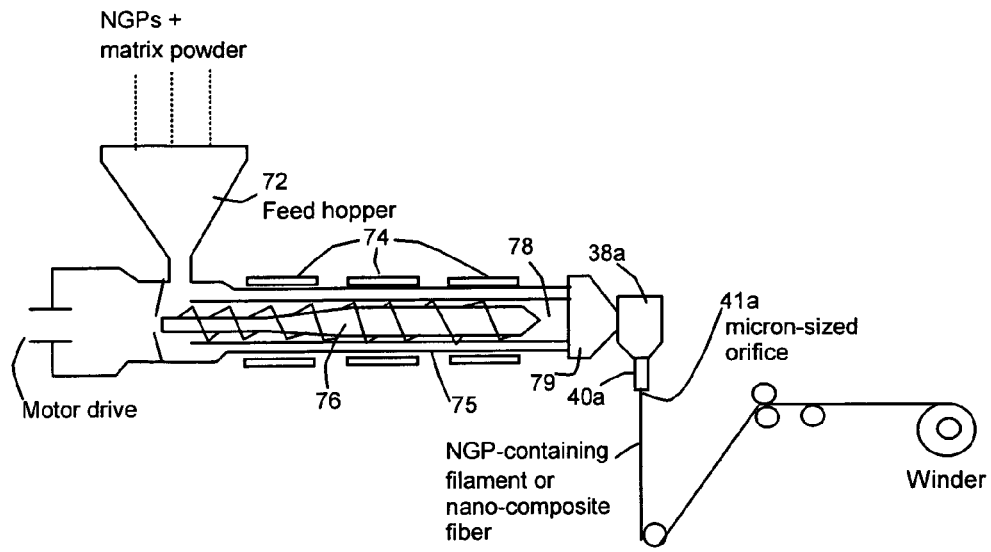
FIG. 2 Schematic of a method for producing nanocomposite materials with a preferred NGP orientation: (a) formation of a nanocomposite filament, (b) placement of oriented filament segments to form a preform, and (c) consolidation of the preform to form the composite structure.
Figure 2:
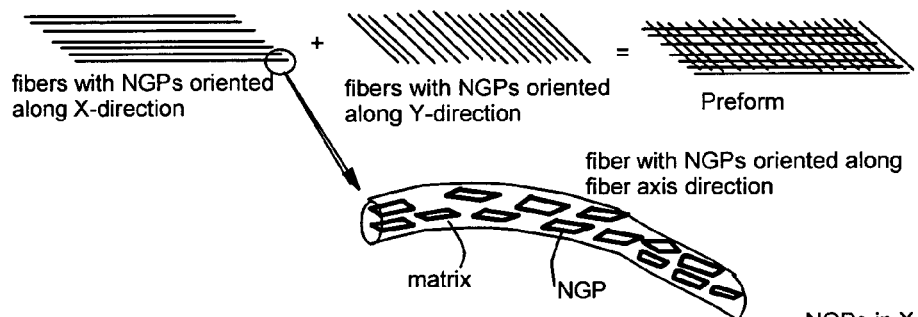
Figure 2:
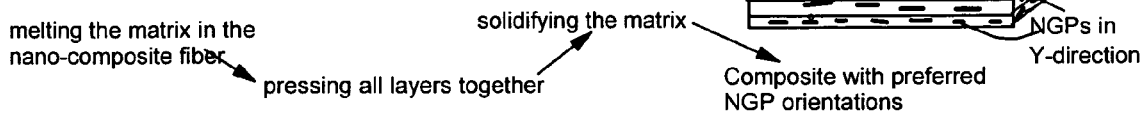

For a thermoplastic matrix, NGPs and thermoplastic powder particles may be mixed and melted (e.g., by feeding the mixture through a hopper 72 into an extruder barrel 75 having plural heating zones 74, as schematically shown in FIG. 2(a)). The extruder has a screw 76 that delivers the mixture in a fluent state (melt) to a cumulative chamber 78 of an extruder die 79, which forces the mixture to flow from a larger chamber 38a to a much smaller chamber 40a with a micron-sized orifice 41a. The orifice preferably has a diameter between about 0.1 µm to about 50 µm. This tapering geometry creates a large shear stress gradient across the diameter of the orifice 41a, which acts to preferentially align the NGPs along the fiber axis direction. The extruded melt mixture is quickly cooled to solidify the fiber, which is a nanocomposite material with an oriented NGP reinforcement. Multiple orifices may be used simultaneously to produce multiple filaments of fiber bundles.

Figure 4:
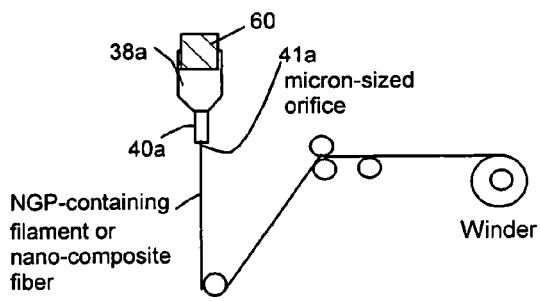
FIG. 4 Schematic of another method for producing nanocomposite materials with a preferred NGP orientation: (a) formation of a nanocomposite filament, (b) arrangement of the filament to form a preform via a textile operation, and (c) consolidation of the preform to form the composite structure.
Figure 4:
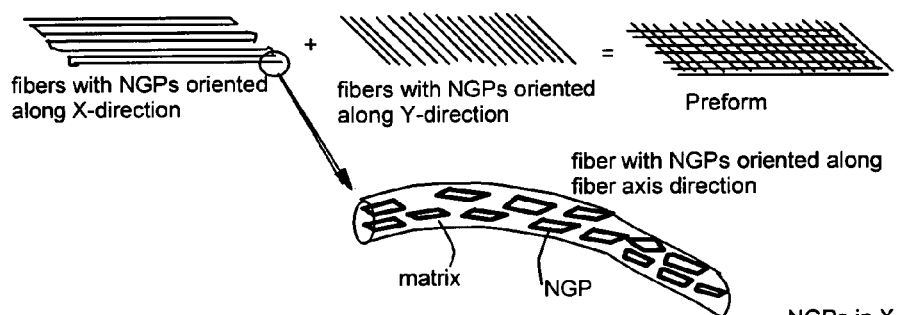
Figure 4:
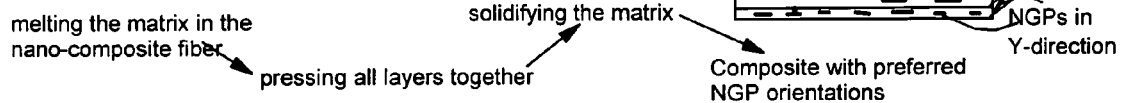

It may be noted that a screw-type extruder, as shown in FIG. 2(a), is but one of several ways to help deliver and extrude or inject the NGP-matrix mixture out through an orifice. We have found that a pressure may be exerted to the chamber 38a (FIG. 4(a)) to force the fluent mixture through the orifice 41a. This pressure may be provided for from a compressed air source (e.g., a gas cylinder or an air compressor), or a piston-type mechanism (e.g., a piston 60 shown in FIG. 4(a)) or a syringe-type configuration. The subsequent steps, shown in FIGS. 4(b) and 4(c), are 6 similar to those in FIGS. 2(b) and 2(c).

Microscopic examinations of these nanocomposite fibers reveal that the length (or 1-axis) and/or the width (or 2-axis) direction of the NGP platelet tends to get oriented along the fiber axis. In other words, the 1-2 plane or graphene plane tends to be aligned along the fiber axis (or, the thickness or 3-axis tends to be perpendicular to the fiber axis). The angle θ between the 1-2 plane and the fiber axis is typically smaller than 30°, which decreases to less than 15° when the shear stress gradient becomes greater. Most of the samples obtained exhibit a preferred orientation that is characterized by having at least 50% of the NGPs oriented at an angle θ smaller than 15°. These nanocomposite fibers, by themselves, are highly useful. They can be used as reinforcements in a thermoset or thermoplastic matrix. They can also be woven into a high-strength fabric that will have anti-static properties due to high electrical conductivity.

For a thermoplastic matrix, a solvent may be used to dissolve the polymer to bring the NGP-polymer mixture to a fluent state. For a thermosetting resin matrix, a solvent may be used to adjust the mixture viscosity. In either case, upon extrusion of the mixture to form a filament, the solvent may be removed to facilitate solidification of the nanocomposite fiber.

As a preferred embodiment, these nanocomposite fibers may be subsequently subjected to a textile operation such as weaving, braiding, knitting, winding, and combinations thereof to align segments of the fibers or filaments along at least a preferred direction (say, the X-direction of an X-Y-Z Cartesian coordinate system). The alignment procedure may be accomplished by cutting the filaments into multiple segments and placing these segments parallel to one another to form a layer. A second layer may be similarly laid up on top of the first layer, with the filament segments oriented in a second direction to produce a preform with two preferred directions (say, X- and Y-directions, FIG. 2(b), or +60° and −60° directions). A textile operation (e.g., weaving) may allow a continuous filament or a bundle of filaments to move continuously with no or few interruptions to form a layer or multiple layers. The process of 3-D weaving, or combined 2-D weaving and stitching, may be utilized to produce a preform with three preferred directions (X-, Y-, and Z-directions). In the latter case, the resulting composite structure will be a three-directional nanocomposite that has superior properties in all three directions. The preform (with a preferred orientation in one, two, or three directions) is then heated to melt out the matrix material with the resulting preform pressurized or compressed into a desired shape, which is then followed by cooling to solidify the matrix material (FIG. 2(c)). This step is similar to the consolidation step of a traditional textile structured composite. The consolidating step typically comprises heating, pressurizing, and solidifying the matrix material.

In a special case of aligning fiber segments in two directions, the procedure may be accomplished layer by layer. Specifically, the method may comprise: (a) providing a mixture of nano-scaled graphene plates and a matrix material in a fluent state; (b) extruding the mixture through an orifice to form a continuous filament; (c) segmenting the filament to form plural filament segments; (d) aligning a first plurality of the filament segments in a first direction to form a first preform layer; (e) aligning a second plurality of the filament segments in a second direction generally perpendicular to the first direction to form a second preform layer; and (f) consolidating the first and second preform layers to form a nanocomposite material. In actual practice, step (c) of cutting the filament may not be necessary. A continuous filament or a bundle of continuous filaments may be directed to move back and forth in, say +X direction and −X direction, to form one layer, followed by moving back and forth in, say +Y direction and −Y direction (or between +45° and −45°, etc., not necessarily in the +Y and −Y directions).

Another preferred embodiment is a composite composition produced in an aforementioned manner. This composite composition is composed of a matrix material and preferably 0.5% to 50% by volume of NGPs, which are oriented along at least one preferred direction. The NGPs may be arranged to exhibit orientations along multiple directions. Although a volume fraction of NGPs that exceeds 50% can be achieved, the mixture melt viscosity can become very high and would demand a higher-torque extruder to process the material. The matrix material in the present invention may be selected from the group consisting of organic, polymeric, metallic, ceramic, glass, carbonaceous materials and combinations thereof, provided these matrix materials can be made into a fluent state. A carbonaceous material, such as petroleum pitch or coal tar pitch, may be used to produce an NGP-based carbon-carbon composites for high temperature structural applications. Again, a preferred orientation may be achieved in one or multiple directions.

As indicated earlier, the nanocomposite filament or continuous fiber produced, prior to filament alignment and consolidation steps, is a useful product by itself. Hence, another preferred embodiment of the present invention is a method of producing oriented NGP-containing nanocomposite fibers. The method includes the steps of (a) providing a mixture of NGPs and a matrix material in a fluent state; (b) extruding the mixture through an orifice for producing a gradient shear stress to form a filament wherein the NGPs are aligned along a filament axis; and (c) solidifying the filament to form the nano-composite fiber. It may be noted that multiple orifices may be used concurrently to produce multiple nanocomposite fibers, which can be collected separately or in bundles. Further, this type of nanocomposite fiber, in a continuous monofilament form or a bundle of multiple filaments, may be mixed with conventional continuous fibers such as high-performance carbon, aramid, glass, and gel-spun polyethylene fibers. Many other types of polymeric or ceramic fibers may also be used. The mixed bundle fibers or co-mingled fibers may be subjected to a textile operation (e.g., weaving, braiding, knitting, stitching, or a combination thereof) to form a preform, which contains both the conventional fiber and oriented NGPs. The preform can then be consolidated to form a hybrid composite. A wide variety of hybrid composites can be produced to meet various desirable applications.

We claim:

1. A method of making a nanocomposite material with a preferred orientation, said method comprising:
    (a) providing a mixture of nano-scaled graphene plates (NGPs) and a matrix material in a fluent state;
    (b) extruding said mixture to form a filament wherein said nano-scaled graphene plates are aligned along a filament axis;
    (c) aligning a plurality of segments of said filament in a first direction, or moving said filament back and forth along a first direction and its opposite direction, to form a NGP-matrix filament preform; and
    (d) consolidating said preform to form said nanocomposite material.

2. The method of claim 1 wherein the matrix material of said mixture is in a molten state.

3. The method of claim 1 wherein said mixture contains a liquid solvent.

4. The method of claim 1 wherein said filament is extruded through an orifice having a diameter between about 0.1 µm to about 50 µm.

5. The method of claim 1 further comprising aligning segments of said filament in a second direction to form the NGP-matrix filament preform.

6. The method of claim 5 further comprising aligning segments of said filament in a third direction to form the NGP-matrix filament preform.

7. The method of claim 1 wherein said aligning step comprises weaving, braiding, knitting, winding, or a combination thereof.

8. The method of claim 1 wherein said consolidating step comprises heating, pressurizing, and solidifying said matrix material.

9. A method of forming a nanocomposite material comprising:
    (a) providing a mixture of nano-scaled graphene plates and a matrix material in a fluent state;
    (b) extruding the mixture through an orifice to form a continuous filament;
    (c) segmenting said filament to form filament segments;
    (d) aligning a first plurality of the filament segments in a first direction to form a first preform layer;
    (e) aligning a second plurality of the filament segments in a second direction to form a second preform layer; and
    (f) consolidating the first and second preform layers to form said nanocomposite material.

* * * * *

UNITED STATES PATENT AND TRADEMARK OFFICE
CERTIFICATE OF CORRECTION

PATENT NO. : 7,662,321 B2
APPLICATION NO. : 11/257508
DATED : February 16, 2010
INVENTOR(S) : Guo et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1019 days.

Signed and Sealed this

Twenty-eighth Day of December, 2010

David J. Kappos
*Director of the United States Patent and Trademark Office*